United States Patent [19]

Ogawa

[11] Patent Number: 5,042,022
[45] Date of Patent: Aug. 20, 1991

[54] OPTICAL DISK RECORDING/REPRODUCING APPARATUS WITH SYNCHRONIZED DATA WRITING

[75] Inventor: Hiroshi Ogawa, Kanagawa, Japan

[73] Assignee: Sony Corporation, Tokyo, Japan

[21] Appl. No.: 183,759

[22] PCT Filed: Jul. 29, 1987

[86] PCT No.: PCT/JP87/00556

§ 371 Date: Mar. 28, 1988

§ 102(e) Date: Mar. 28, 1988

[87] PCT Pub. No.: WO88/01092

PCT Pub. Date: Feb. 11, 1988

[30] Foreign Application Priority Data

Jul. 31, 1986 [JP] Japan .................. 61-180925
Aug. 13, 1986 [JP] Japan .................. 61-190274

[51] Int. Cl.$^5$ .......................... G11B 7/095; G11B 7/00
[52] U.S. Cl. ........................................ 369/47; 369/54; 369/58; 369/116
[58] Field of Search ............... 369/13, 116, 47, 48, 369/54, 58, 59, 100

[56] References Cited

U.S. PATENT DOCUMENTS

| | | | |
|---|---|---|---|
| 4,685,097 | 8/1987 | Van der Put | 369/116 |
| 4,733,385 | 3/1988 | Henmi et al. | 369/13 |
| 4,744,074 | 5/1988 | Imanaka et al. | 369/278 |
| 4,764,913 | 8/1988 | Sasaki et al. | 369/59 |
| 4,783,776 | 11/1988 | Ishigaki et al. | 369/59 |
| 4,796,250 | 1/1989 | Kobayashi et al. | 369/116 |

FOREIGN PATENT DOCUMENTS

| | | |
|---|---|---|
| 0107754 | 5/1984 | European Pat. Off. |
| 0145279 | 6/1985 | European Pat. Off. |
| 0164745 | 12/1985 | European Pat. Off. |
| 0169579 | of 1986 | European Pat. Off. |
| 0202914 | 11/1986 | European Pat. Off. |
| 56-16950 | 2/1981 | Japan . |
| 57-181429 | 11/1982 | Japan . |
| 58-14333 | 1/1983 | Japan . |
| 58-153239 | 9/1983 | Japan . |
| 60-239929 | 1/1985 | Japan . |
| 61-22450 | 1/1986 | Japan . |
| 61-190472 | 8/1986 | Japan . |
| 62-119743 | 6/1987 | Japan . |

Primary Examiner—Stuart S. Levy
Assistant Examiner—Hoa Nguyen
Attorney, Agent, or Firm—Hill, Van Santen, Steadman & Simpson

[57] ABSTRACT

An optical disc recording/reproducing apparatus for recording and reproducing data using an optical disc as the recording medium, wherein use is made of an optical disc (1) having pit regions (2a) with servo pits and data regions (2a) on which data will be written, that are alternately provided along the circumferential direction, reference clocks are formed in synchronism with said servo pits, and a laser diode (21) is driven by pulses in synchronism with the reference clocks to write or erase the data, thus enabling the life of the laser diode to be lengthened and the disc capacity to be effectively utilized.

9 Claims, 7 Drawing Sheets

OPTICAL DISK RECORDING/REPRODUCING APPARATUS WITH SYNCHRONIZED DATA WRITING

TECHNICAL FIELD

This invention relates to an optical disk recording/reproducing apparatus wherein an optical disk is used as the recording medium to effect data recording and reproduction.

BACKGROUND

An opto-magnetic disk has been known as the large capacity recording medium permitting data re-writing. The data writing, reading and erasure to and from the opto-magnetic disk are usually performed with the use of a laser beam emitted by a laser diode. Heretofore, at the time of data writing or erasure, the laser diode remains energized during the periods other than the periods during which the laser beam irradiation is actually required, with the result that the life of the laser diode is short and the demanded guarantee time cannot be satisfied.

The tracks on the opto-magnetic disk are each divided into a plurality of sections, each of which is provided with a gap region for absorbing temporary errors, with the data being recorded in synchronism with each sector as one unit to effect data management or control on the sector basis.

With the opto-magnetic disk apparatus in which the opto-magnetic disk is employed as the recording medium and the data are recorded and/or reproduced by a laser diode, problems are presented as to the life of the laser diode and the reduction in the effective disk capacity, with the gap region provided in each track sector on the opto-magnetic disk representing an ineffective recording region.

It is therefore an object of the present invention to provide an optical disk recording/reproducing apparatus enabling the life of the laser diode to be lengthened and the disk capacity to be effectively utilized.

SUMMARY OF THE INVENTION

For accomplishing the above object, the present invention is applied to an opto-magnetic disk apparatus employing, for example, an opto-magnetic disk as the recording medium, and the optical disk recording/reproducing apparatus according to the present invention is characterized in that an opto-magnetic disk having pit regions with servo pits and data regions on which data will be written, that are alternately provided along the circumferential direction, is revolved at a constant angular velocity, reference clocks are formed in synchronism with said pits on the basis of the detection output obtained upon detecting said servo pits, and in that a laser diode is driven by pulses in synchronism with said reference clocks to write or erase data to or from said data region.

According to the present invention, the laser diode is driven by pulses at the timing of the reference clocks synchronized with the servo pits in the pit region of the opto-magnetic disk so that the data synchronized for the disk in its entirety may be written in each data region. The data thus written are erased on the bit-by-bit basis by driving the laser diode with pulses at the timing of the aforementioned reference clocks.

BEST MODE FOR PRACTICE OF THE INVENTION

Figure 1:
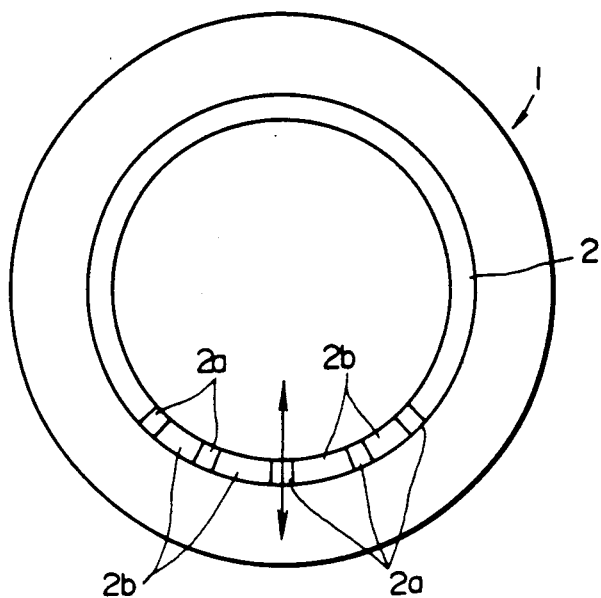
FIG. 1 is a schematic view showing recording patterns of the opto-magnetic disk employed in an embodiment of the present invention.

An embodiment of an opto-magnetic disk apparatus to which the present invention is applied will be explained by referring to the drawings.

Referring to FIG. 1, wherein the recording pattern of the opto-magnetic disk employed in the present embodiment is illustrated, an opto-magnetic disk 1 has the diameter of, for example, about 13 cm, and the storage capacity of not less than 300M bytes on one side. The disk 1 is rotated with a constant angular velocity and tracks 2 are formed concentrically at the rate of one track per each disk revolution for recording the data. About 18,000 to 20,000 tracks are formed on one side, with each track being divided into, for example, 32 sectors.

Figure 2:
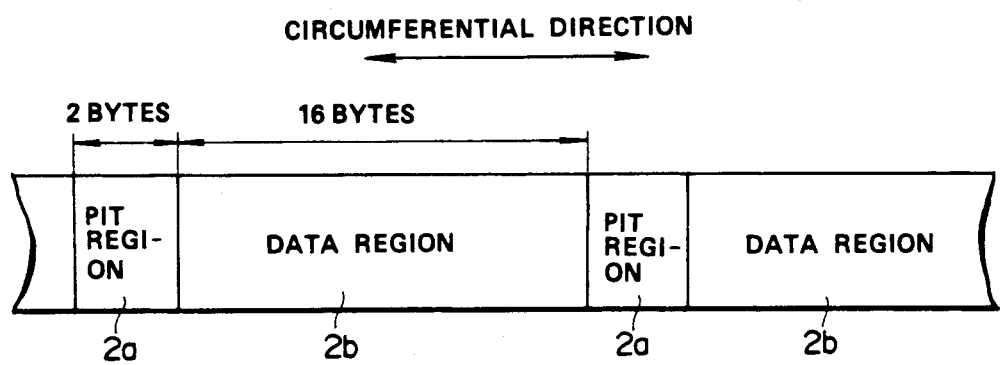
FIG. 2 is a schematic view showing the constitution of each track in the above embodiment.

As shown to an enlarged scale in FIG. 2, each track is composed of pit regions $2a$ having servo pits and data regions $2b$ on which data will be written, these regions $2a$ and $2b$ being alternately provided along the circumferential direction of the disk. Each pit region $2a$ has a length of 2 bytes and each data region $2b$ has a length of 16 bytes, when measured in terms of the numbers of bits.

Figure 3:
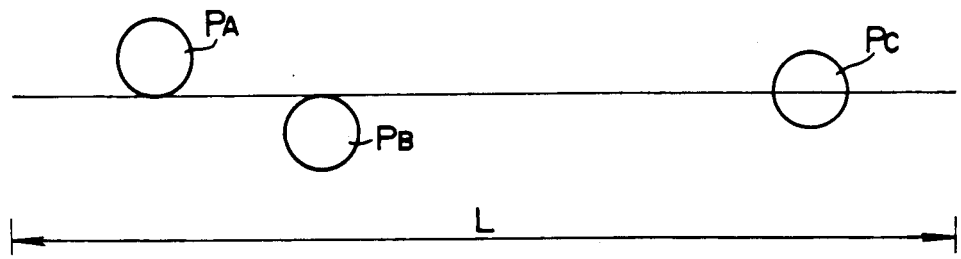
FIG. 3 is a schematic view showing the construction of each pit region.

Three pits $P_A$, $P_B$ and $P_C$ are formed in each pit region $2a$, as shown in FIG. 3. The pits $P_A$ and $P_B$ are formed with a vertical offset on both sides of a centerline of the track formed in the disk 1, while the pit $P_C$ is formed on the centerline of the track. These pit $P_A$, $P_B$ and $P_C$ are about 0.5 to 1.0 micron in diameter, with the actual length L of the pit region $2a$ being 19 to 30 microns.

Figure 4:
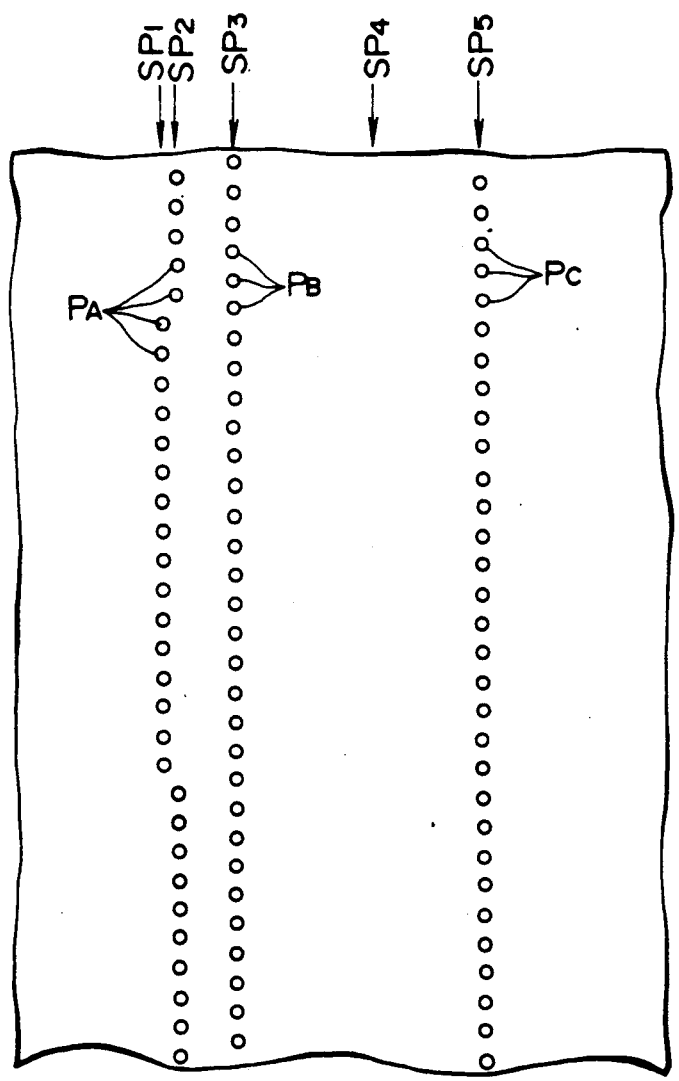
FIG. 4 is a schematic view showing the arrangement of the pits existing along the radial direction of the disk.

FIG. 4 shows the disposition of the pits $P_A$, $P_B$ and $P_C$ along the radial direction of the disk as indicated by the arrow mark in FIG. 1. Thus the pits $P_B$ and $P_C$ are arranged in straight lines, whereas the pits $P_A$ are offset lengthwise of the track by groups of 16 consecutive pits. The offset disposition of the pits $P_A$ by groups of 16 consecutive pits is utilized to effect traverse counting as later described in order for the optical pickup to find the track number of the track being scanned. The pits $P_A$ are sampled by the sampling pulse $SP_1$ or the sampling pulse $SP_2$ and the pits $P_B$ and $P_C$ are sampled by the sampling pulses $SP_3$ and $SP_5$, respectively, while the mirror surface regions between the pits $P_B$ and $P_C$ are sampled by the sampling pulses $SP_4$ so as to be utilized for various servo control operations and clock generation as later described.

Figure 5:
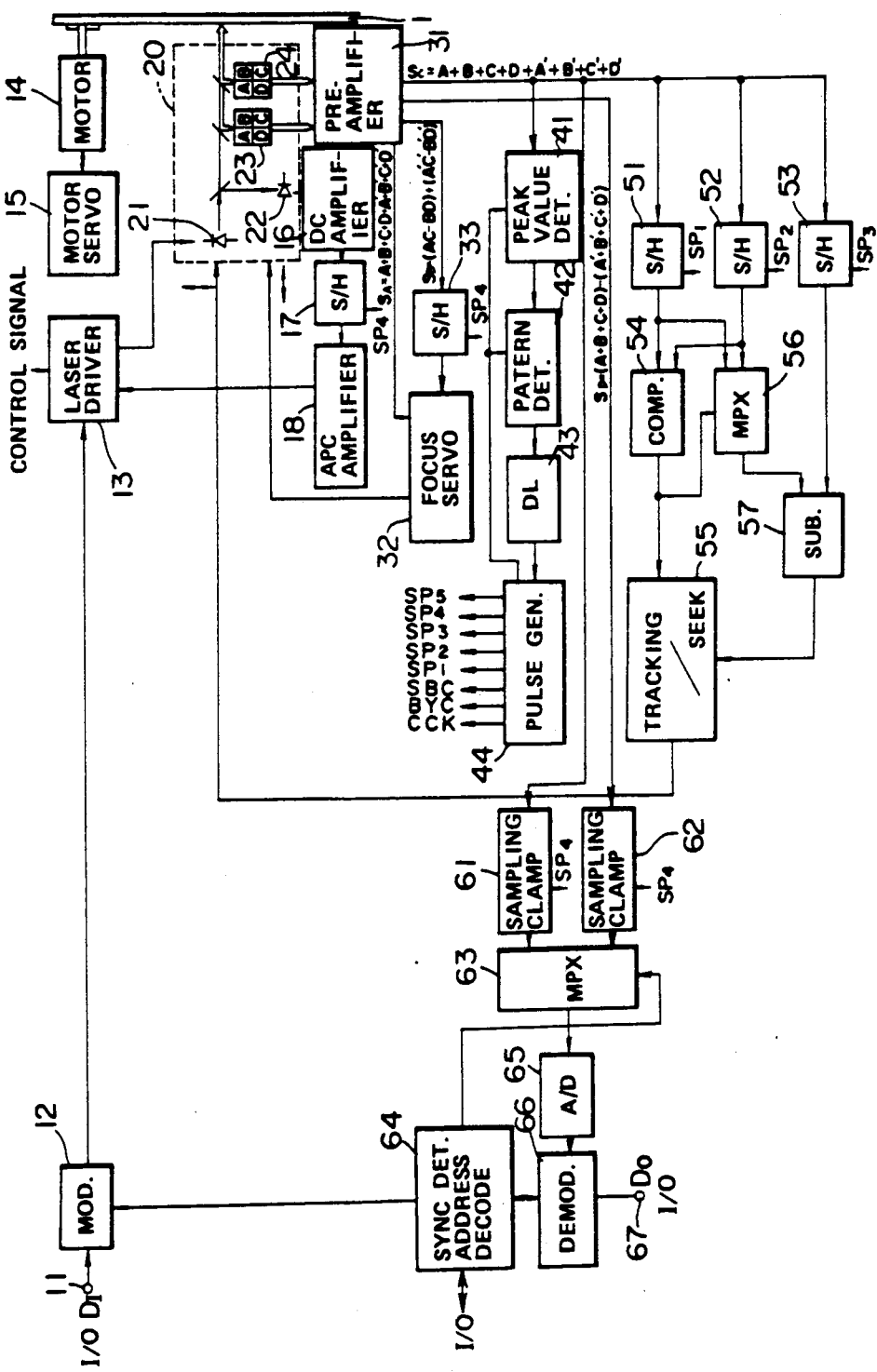
FIG. 5 is a block diagram showing the overall construction of an embodiment of the opto-magnetic disk apparatus according to the present invention.

Referring to FIG. 5, wherein the overall construction of the opto-magnetic disk apparatus of the present invention is illustrated, data $D_1$ to be recorded are supplied to an input terminal 11 from, for example, a computer through an interface (I/O). These data $D_1$ are supplied to a modulating circuit 12 where they undergo modulation including bit conversion before being supplied to a laser drive circuit 13. Write, read or erasure mode control signals are supplied from the interface to the laser drive circuit 13 via the "Control Signal" Bus. The drive circuit 13 which, responsive to these control signals, operates to supply signals for driving the laser diode 21 of the optical pickup 20, in order to supply drive pulse signals timed in accordance with the channel clocks CCK to the laser diode 21 as the reference clocks during data recording and erasure, while also supplying high frequency drive signals to the laser diode 21 during data reading.

The optical pickup 20 includes, in addition to the laser diode 21, a photodiode 22 and photodetectors 23 and 24, each divided into four sections. The photodiode 22 is designed to sense the intensity of the laser light emitted by the laser diode 21. The photodetectors 23, 24 are disigned to sense the laser light reflected by the opto-magnetic disk 1, one of the photodetectors sensing the positive direction component of the Kerr rotation angle and the other sensing its negative direction component.

An electric motor 14 is controlled by a motor servo circuit 15 by, for example, a phase locked loop (PLL) to cause the disk 1 to the rotated accurately at a prescribed velocity (angular velocity).

The laser light supplied from the laser diode 21 is irradiated on the opto-magnetic disk 1, while being supplied to the photodiode 22. The output of the photodiode 22 proportionate to the laser light intensity is supplied to a sample and hold circuit (S/H) 17 through a d.c. amplifier 16. The S/H circuit 17 performs a sample and hold operation in accordance with the sampling pulses $SP_4$ (see FIG. 4) and the output therefrom is supplied through an APC amplifier 18 to the laser drive circuit 13 as the automatic power control or APC signals. This causes the intensity of the laser light supplied from the laser diode 21 to be maintained at a prescribed value.

The laser light reflected by the disk 1 is supplied via a light detector, not shown, to photo-detectors 23 and 24 of the optical pickup 20, the output signals of which are supplied to a pre-amplifier 31. From the pre-amplifier 31, a light detection signal $S_A$ or the sum of the outputs from the respective light receiving regions of the photo-detectors 23 and 24 ($S_A = A+B+C+D+A'+B'+C'+D'$) (including the d.c. components) are directly supplied to a focus servo circuit 32, and a light detection signal $S_B$ composed of the outputs from the respective light receiving regions of the photodetectors 23 and 24 ($SB = (AC - BC) + (A'C' - B'D')$) are also supplied to the focus servo circuit 32 through the S/H circuit 33 adapted for performing the sample and hold operations in dependence upon the sampling pulses $SP_4$. Focus servo control signals produced in the focus servo circuit 32 on the basis of the respective signals $S_A$ and $S_B$ are supplied for focus control to the optical pickup 20.

The light detection signal SC from the pre-amplifier 31 ($S_C = A+B+C+D+A'+B'+C'+D'$) are supplied to a peak position detection circut 41, S/H circuit 51, 52 and 53 and to a sampling clamp circuit 61. The light detection signal $S_C$ is the detection signal of patterns of projections and recesses in the pit region 2a of the disk 1. The peak position of the light detection signal $S_C$ is detected in the peak position detection circuit 41, while the pit pattern having an interval proper to the interval between the pits $P_B$ and $P_C$ on the disk 1 are detected in a proper pattern detection circuit 42 to detect the pits $P_C$. The detected output is supplied via a delay circuit 43 to a pulse generator 44. Channel clocks CCK are generated in the pulse generator 44 as the reference clocks synchronized with the pits $P_C$ on the basis of the detection output obtained in the proper pattern detecting circuit 42. In the pulse generator 44, byte clocks BYC, servo byte clocks SBC and sampling pulses $SP_1$, $SP_2$, $SP_3$, $SP_4$ and $SP_5$ are formed and outputted, as shown in FIG. 4. Although not shown, the channel clocks CCK are supplied to all of the circuit blocks The sample pulses $SP_1$, $SP_2$ and $SP_3$ are supplied to an S/H circuit 51, S/H circuit 52 and to an S/H circuit 53, respectively. The sampling pulses $SP_4$ are supplied to the aforementioned S/H circuit 17 and 33 while being also supplied to the sampling clamp circuit 61 and 62. It is noted that the sampling pulses $SP_5$ are used for detecting the moving direction, for example, of the optical pickup 20. The peak position detection circuit 41 and the proper pattern detection circuit 42 are also supplied with gate pulses from the pulse generator 44.

In the S/H circuits, sample and hold operations are performed of the supplied light detection signal by the aforementioned sampling pulses $SP_1$, $SP_2$ and $SP_3$. The signal levels of the outputs from the S/H circuits 51 and 52 are compared in a comparator 54. The comparator output is inverted every 16 tracks as the result of the aforementioned radial disposition of the pits $P_A$ on the disk 1, and is supplied as the traverse count signal to a tracking servo/seek circuit 55, while also being supplied to a multiplexer 56. From this multiplexer 56, the signal from the S/H circuit 51 or from the S/H circuit 52, whichever is higher in signal level, is selectively outputted and supplied to a subtractor 57. A difference signal between the signal from the multiplexor 56 and that from the S/H circuit 53 is formed and supplied therefrom as the tracking error signal to the aforementioned tracking servo/seek circuit 55. The tracking servo/seek circuit 55 performs tracking and feed control operations for the optical pickup 20.

The aforemntioned light detection signal $S_C$ and a light detection signal $S_D$ ($S_D = (A+B+C+D) - (A'+B'+C'+D')$) are supplied from the pre-amplifier 31 to the sampling clamp circuits 61 and 62, respectively. The light detection signal $S_C$ is the detection signal of patterns of projections and recesses in the pit region 2a of the disk 1, as discussed above. The light detection signal $S_D$ is the detection signal of data written in the data region 2b of the disk 1. In the sampling clamps 61 and 62, the respective signals are clamped by the sampling pulses $SP_4$ before being supplied to the multiplexor 63. The switching selecting operation of the multiplexor 63 is controlled by control signals from a sync detection/address decoding circuit 64. Assuming that, for example, the light detection signal $S_C$ is supplied by way of the sampling clamp circuit 61 and the multiplexor 63 to an analog to digital (A/D) converter 65 so as to be converted into the digital value which is then supplied to a demodulator 66, the output from the demodulator 66 is supplied to a sync detect/address decode circuit 64 where the sync signals are detected and the address information is decoded. When the address information of the data supplied through an interface from a computer so as to be read coincides with the actual address, the multiplexor 63 is switched, so that the light detection signal $S_D$ for the data region 2b is supplied to the A/D converter 65 and to the demodulator 66 to supply the data $D_0$ that have undergone demodulation including bit conversion from the output terminal 67. These data $D_0$ are supplied through an interface to a computer. During data writing, control signals are supplied from the sync detect/address decode circuit 64 to a modulator 12 and, in accordance with these control signals, the data to be written are transmitted from the demodulator 12 to the laser drive circuit 13.

Figure 6:
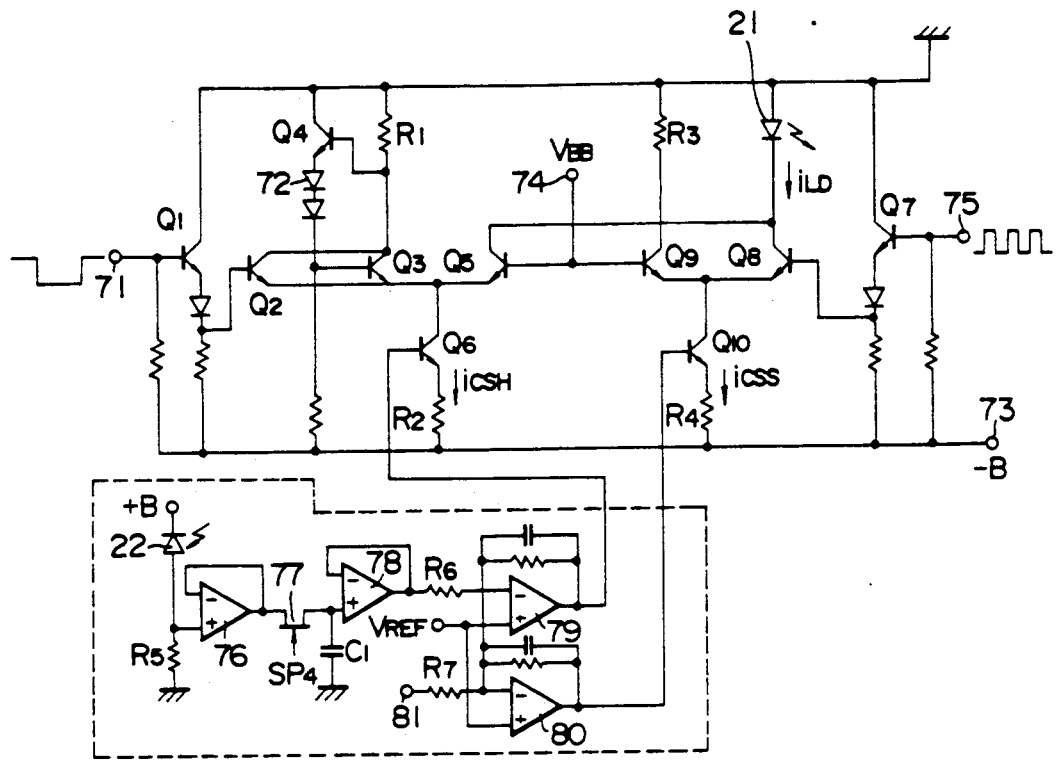
FIG. 6 is a circuit diagram showing a typical construction of a laser drive circuit in the above embodiment.

FIG. 6 illustrates a typical construction of the drive control system for the laser diode 21.

Referring to FIG. 6, control pulses indicating the read operation are supplied to a terminal 71, while control pulses indicating the write or erasure operations are supplied to the terminal 75.

The terminal 75 is connected via transistor $Q_1$ to a base of a transistor $Q_2$. The transistor $Q_2$ is connected in a collector and emitter common configuration to a transistor $Q_3$. The collector of the transistor $Q_3$ is connected to a resistor $R_1$ and to a base of the transistor $Q_4$. The emitter of the transistor $Q_4$ is connected via diode 72 to the base of the transistor $Q_3$. The aforementioned transistor $Q_3$ and $Q_4$ and the diode 72 make up a ring oscillator. The transistors $Q_3$ and $Q_5$ have their emitters connected in common to the collector of a transistor $Q_6$ used as a current source, while the emitter of the transistor $Q_6$ is connected via resistor $R_2$ to a power source terminal 73. The base of the transistor $Q_5$ is connected to a terminal 74 adapted to supply a prescribed base potential $V_{BB}$.

The terminal 75 is connected via transistor $Q_7$ to the base of a transistor $Q_8$. The collector of the transistor $Q_8$ is connected the laser diode 21, while being also connected to the collector of the transistor $Q_5$. A transistor $Q_9$ has its collector grounded via resistor $R_3$ and its base connected to the terminal 74. The transistors $Q_8$ and $Q_9$ have their emitters connected in common to the collector of the current source transistor $Q_{10}$, the emitter of which is connected via resistor $R_4$ to the power source terminal 73.

The intensity of the laser light radiated from the laser diode 21 is detected by a photodiode 22 which is connected to a resistor $R_5$ and to a switching element 77 through an operational amplifier 76 adapted for d.c. amplification. The switching element 77 is connected to a capacitor $C_1$ and to an operational amplifier 78 acting as a high input impedance buffer. The switching element 77 is supplied with the aforementioned sampling pulses $SP_4$ and performs a sampling operation of sampling the output of the photodiode 22 supplied via operational amplifier 76 by the aforementioned sampling pulses $SP_4$ and holding the sampled output in the capacitor $C_1$. The output of the operational amplifier 78 is connected via resistor $R_6$ to the inverting inputs of the operational amplifiers 79 and 80. A reference voltage $V_{ref}$ is supplied to each of the non-inverting inputs of the operational amplifiers 79 and 80, the one output of which is connected to the base of the transistor $Q_6$ and the other output of which is connected to the base of the transistor $Q_{10}$. The inverting input of the operational amplifier 80 is connected via resistor $Q_7$ to a terminal 81. To this terminal 81 are supplied control signals for switching the output of the laser diode 21 between the write and erase modes.

In the above described drive control system for the laser diode 21, when the terminal 71 is at the low (L) level, the transistors $Q_1$ and $Q_2$ are kept in the OFF state, the ring oscillator formed by the transistors $Q_3$ and $Q_4$ performing the high frequency oscillation with the frequency of, for example, about 100 to 500 MHz. As a result, the laser diode 21 is supplied via transistor $Q_5$ with a high frequency current having the current $i_{CSH}$ by the current source transistor $Q_6$ as the peak value, so as to be thereby driven into high frequency operation. With the terminal 71 in the high (H) level, the transistor $Q_1$ and $Q_2$ are kept in their ON state, so that the current $i_{CSH}$ by the transistor $Q_6$ flows through the resistor $R_1$ via transistor $Q_2$, while the driving of the laser diode 21 and the oscillation of the ring oscillator are terminated.

The driving of the laser diode 21 by the high frequency current of the laser diode 21 is achieved with the control pulses going low during the read out operation being supplied to the terminal 71.

With the terminal 75 in the L level, the transistors $Q_7$ and $Q_8$ are kept in the OFF state, with the current $i_{CSS}$ by the current source transistor $Q_{10}$ not flowing through the laser diode 21 but flowing via transistor $Q_9$ through the resistor $R_3$. With the terminal 75 in the H level, the respective transistors $Q_7$ and $Q_8$ are turned on, with the current $i_{CSS}$ by the current source transistor $Q_{10}$ flowing via transistor $Q_8$ through the laser diode 21. In the present embodiment, during the write mode, for example, control pulses associated with data are supplied to the terminal 75 for driving the laser diode 21 with pulses in association with the data in order to effect data writing.

Figure 7:
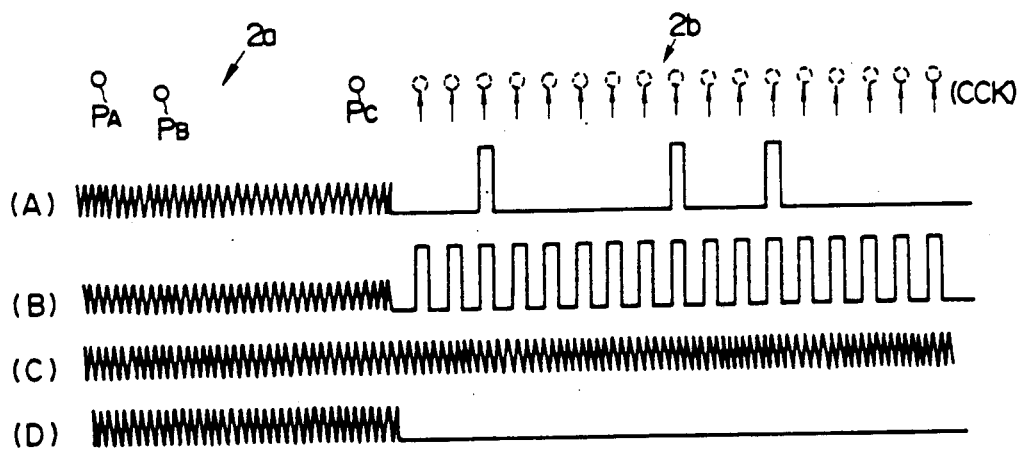
FIG. 7 is a timing chart for understanding the operation of the aforementioned laser drive circuit.

The operation of the drive control system of the laser diode 21 is explained more specifically by referring to FIG. 7, wherein the waveform of the current $i_{LD}$ supplied to the lasr diode 21 is shown. Thus the current waveforms for the write-, erase-, read-out and stand-by modes are shown in FIGS. 7A, 7B, 7C and 7D, respectively.

With the write mode, the terminals 71 and 75 are kept in the L level during the period corresponding to the aforementioned pit region 2a, so that, as shown in FIG. 7A, the laser diode 21 is driven by the high frequency current. During the period correspondig to the data region 2b, the terminal 71 is kept in the H level and the data pulse associated with the write data are supplied to the terminal 75 for driving the laser diode 21 with pulses in order to effect data writing. The write timing, that is, the timing of the aforementioned data pulses, is coincident with the channel clocks CCK formed on the basis of the detection output of the pits $P_C$.

It is noted that, during the period corresponding to the aforementioned pit region 2a, the laser diode 21 is driven necessarily by the high frequency current in order to effect the read operation even when the operating mode is other than the write mode.

With the erasure mode, the terminal 71 is kept at the H level during the period corresponding to the data region 2b and repetitive pulses are supplied to the terminal 75 for driving the laser diode 21 by pulses to effect data erasure, as shown in FIG. 7B. The timing of the erasure operation, that is, that of the aforementioned repetitive pulses, is also coincident with that of the channel clocks CCK, such that the data recorded in the data region 2b are erased sequentially on the bit-by-bit basis.

With the read-out mode, both the terminals 71 and 75 are maintained in the L level during the periods corresponding to the pit region 2a and data region 2b, that is, the totality of the pulse period, the laser diode 21 being thus driven by the high frequency current as shown in FIG. 7C in order to effect data reading.

With the stand-by mode, the terminal 75 is maintained in the L-level during the period corresponding to the data region 2b to stop the driving of the laser diode 21 in order to perform only the reading of the pit region 2a.

In any of the aforementioned operating modes, the bases of the transistors $Q_6$ and $Q_{10}$ are controlled by automatic power control by the operation of the APC circuit system including the photo-diode 22 in order to maintain a prescribed output (light intensity) of the laser diode 21. The control signal voltage applied to the terminal 81 is set to a value for the record mode different from one for the erase mode so that a larger drive current will flow through the laser diode 21 during the erasure mode than during the record mode to provide for more reliable erasure operation.

By driving the laser diode 21 by pulses more efficiently during the data write and erasure modes, it becomes possible to extend the life of the laser diode 21 while achieving the saving in power and reducing radio hindrances.

Figure 8:
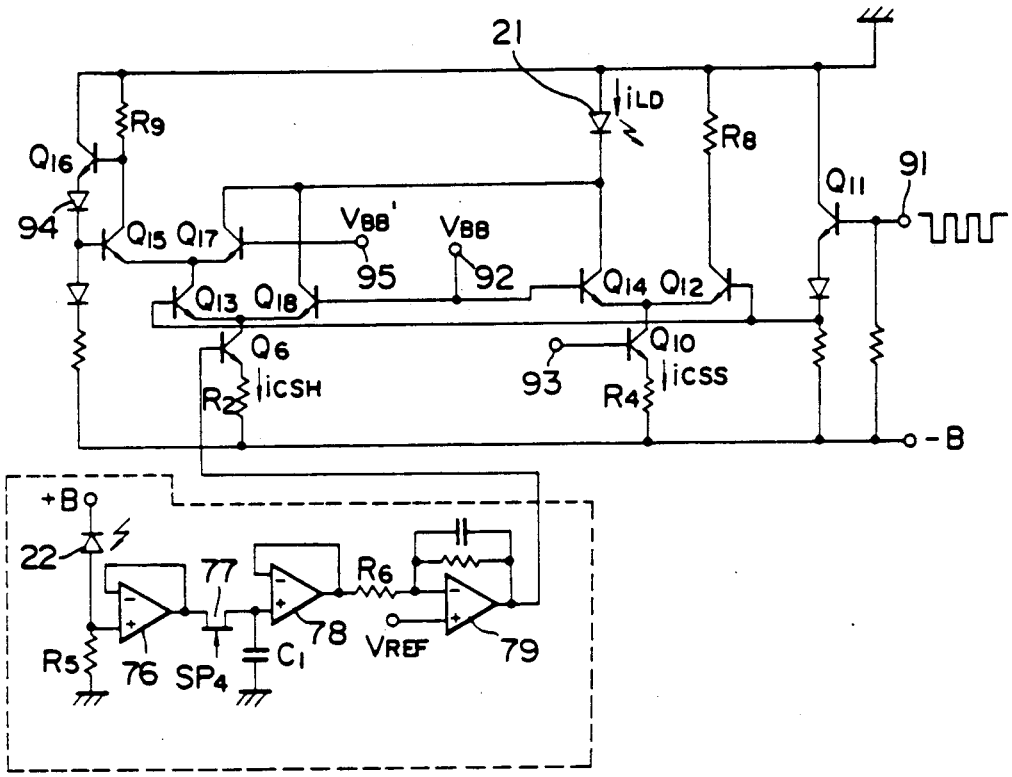
FIG. 8 is a circuit diagram showing another typical construction of the laser drive circuit in the above embodiment.

FIG. 8 illustrates a modified drive control system for the laser diode 21. It is noted that parts or components corresponding to those shown in FIG. 6 are indicated in FIG. 8 by the same reference numerals and the corresponding description is omitted.

In the present system, the terminal 91 supplied with control pulses is connected via transistor $Q_{11}$ to bases of transistors $Q_{12}$ and $Q_{13}$, while the collector of the transistor $Q_{12}$ is grounded via resistor $R_8$. The transistor $Q_{14}$ has its collector connected to the laser diode 21 and its base to a terminal 92 supplied with a predetermined base voltage $V_{BB}$. The emitters of the transistors $Q_{12}$ and $Q_{14}$ are connected in common to the collector of the current source transistor $Q_{10}$. The base of the transistor $Q_{10}$ is connected to a terminal 93 supplied with a control signal whereby the drive current caused to flow through the laser diode 21 is switched between the record and erasure modes.

The collector of the transistor $Q_{15}$ is connected to the resistor $R_9$ and to the base of the transistor $Q_{16}$. The emitter of the transistor $Q_{16}$ is connected via diode 94 to the base of the transistor $Q_{15}$. The transistors $Q_{15}$, $Q_{16}$ and the diode 94 constitute a ring oscillator. The transistor $Q_{17}$ has its collector connected to the laser diode 21 and its base connected to a terminal 95 supplying the prescribed base voltage $V_{BB'}$. The transistors $Q_{15}$ and $Q_{17}$ have their emitters connected in common to the collector of the transistior $Q_{13}$. The transistor $Q_{18}$ has its collector connected to the laser diode 21 and its base to the terminal 92. The transistor $Q_{13}$ and $Q_{18}$ have their emitters connected in common to the collector of the current source transistor $Q_6$.

The above described driving control system of the laser diode 21 operates in the following manner.

With the terminal 91 at the L-level, the transistors $Q_{11}$, $Q_{12}$ and $Q_{13}$ are turned off, while the transistors $Q_{14}$ and $Q_{15}$ are turned on. Therefore, the current $i_{CSS}$ flowing through the transistor $Q_{14}$ and the current $i_{CSH}$ flowing through the transistor $Q_{18}$ are supplied to the laser diode 21. Thus the drive current ($i_{CSS}+i_{CSH}$) is supplied to the laser diode 21, such that an automatic power control is caused to occur both with the write and erasure modes by the APC signals supplied from the APC circuit system to the base of the transistor $Q_6$.

With the terminal 91 at the H level, the transistors $Q_{11}$, $Q_{12}$ and $Q_{13}$ are turned on, while the transistors $Q_{14}$ and $Q_{18}$ are turned off. The transistors $Q_{15}$ and $Q_{16}$ act as a ring oscillator to perform a high frequency oscillation. As a result, the high frequency current having the current $i_{CSH}$ by the current source transistor $Q_6$ as the peak value is supplied via transistors $Q_{13}$ and $Q_{17}$ to the laser diode 21 which is thereby driven into high frequency operation. The current by the transistor $Q_{10}$ flows to the resistor $R_8$ via transistor $Q_{12}$.

Figure 9:
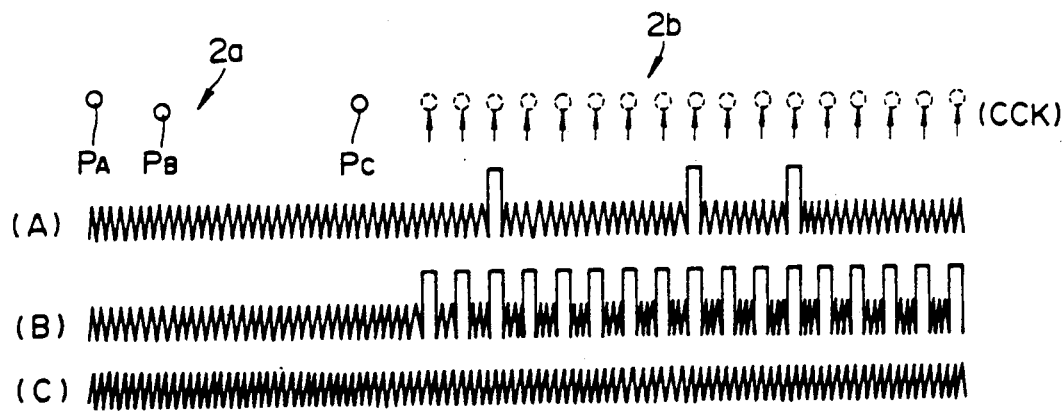
FIG. 9 is a timing chart for understanding the operation of the laser drive circuit shown in FIG. 8.

The operation of the drive control system for the laser diode 21 shown in FIG. 8 is explained more specificaly by referring to FIG. 9, wherein the waveform of hte current $i_{LD}$ supplied to the laser diode 21 is shown. Thus the current waveforms during the write-, erasure and read out modes are shown in FIGS. 9A, 9B and 9C, respectively.

During the write mode, data pulses associated with the write data are supplied to the terminal 91 during the periods corresponding to the data region 2b, so that the laser diode 21 is driven by pulses, as shown in FIG. 9A, in order to effect data writing in the data region 2b. During the time interval devoid of the aforementioned data pulses, with the terminal 91 being at the H-level, the transistors $Q_{15}$ and $Q_{16}$ act as a ring oscillator to drive the laser diode 21 by the high frequency current. This high frequency driving affords a so-called preheating for the actual data write operation for assuring a smooth writing operation.

With the erasure mode operation, as shown in FIG. 9B, the laser diode 21 is driven by the high frequency, at the same time that the erasure pulses having the prescribed repetitive pulse are supplied to the terminal 91 during the time period corresponding to the data region 2b, so that the laser diode 21 is driven by pulses to effect the erasure of the data region 2b.

With the read-out mode, the terminal 91 is maintained at an H-level, so that, as shown in FIG. 9C, the laser diode 21 is driven by the high frequency current to effect data reading. By reading the data in this manner with the lasser diode 21 driven by the high frequency current, it becomes possible to prevent the noise occurrence due to the return beam of the laser light irradiated on the opto-magnetic disk 1 while extending the service life of the laser diode 21.

It is noted that, in the drive control system shown in FIG. 6, the operation similar to that shown in FIG. 9 may be obtained when the bases of the transistors $Q_2$ and $Q_3$ are connected to each other for supplying one-input control pulses.

Figure 10:
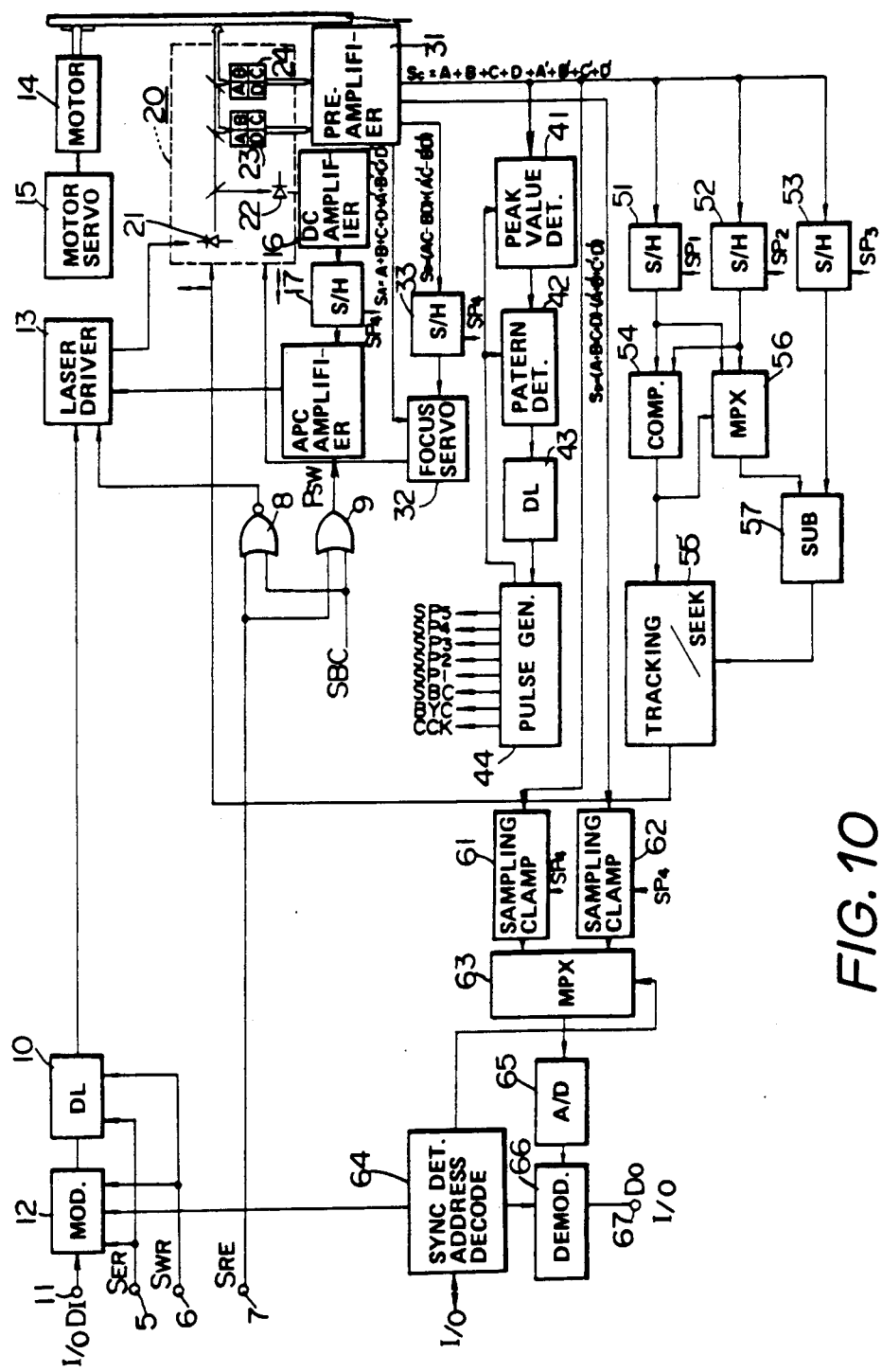
FIG. 10 is a block diagram showing the overall construction of a modified embodiment of the opto-magnetic disk according to the present invention.
Figure 11:
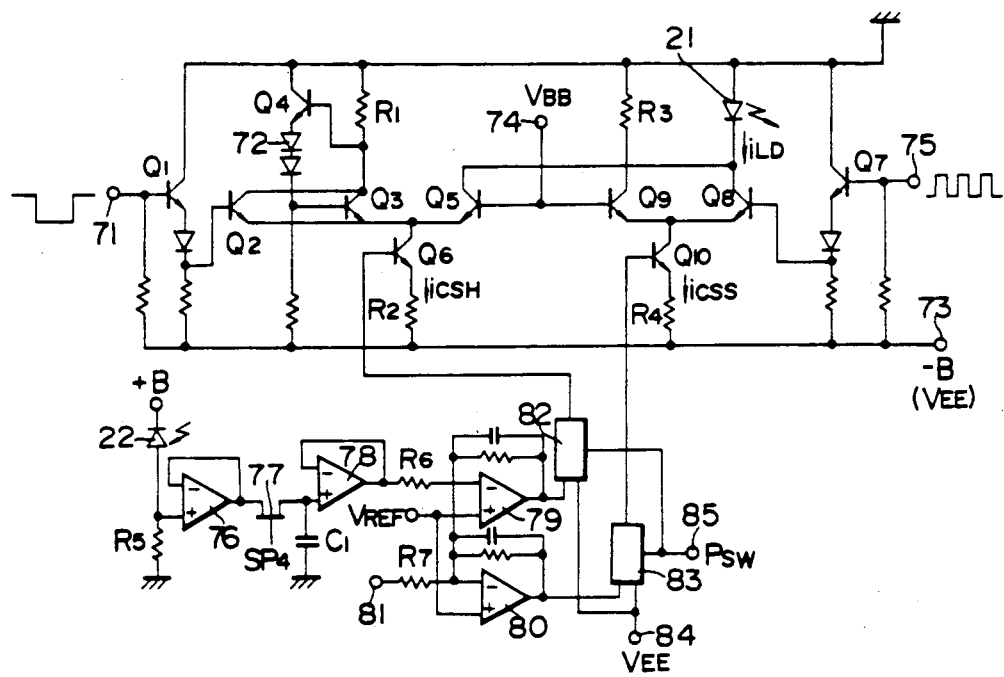
FIG. 11 is a circuit diagram showing a further typical construction of the laser drive circuit in the above modified embodiment.

FIG. 10 shows a modified embodiment of the opto-magnetic disk apparatus shown in FIG. 5. The apparatus shown herein includes control input terminals 5, 6 and 7 supplied with an erasure mode signal $S_{ER}$, a write mode signal $S_{WR}$ and a read mode signal $S_{RE}$ through an interface, respectively. The erasure mode signal $S_{ER}$ and the write mode signals $S_{WR}$ are supplied to the modulator 12 and the read mode signals are supplied from the control input terminal 7 through the NOR gate 3 to the laser drive circuit 13 while also being supplied via OR gate 9 to the APC amplifier 18. It is noted that a delay compensation circuit 10 is provided between the modulator 12 and the laser drive circuit 13 and that the aforemntioned erasure mode signal $S_{ER}$ and write mode signals $S_{WR}$ are also supplied to this delay compensation circuit 10 from the control input terminals 5 and 6, respectively The laser drive control system of the present embodiment formed by the aforementioned laser drive circuit 13 and the APC amplifier 18 is shown more specifically in FIG. 11 wherein the output terminal of the operational amplifier 79 in the drive control system shown in FIG. 6 is connected via switching circuit 82 to the base of the transistor $Q_6$, while the output terminal of the operational amplifier 80 is connected via switching circuit 83 to the base of the transistor $Q_{10}$. These switching circuit 82 and 83 are connected to a terminal 84 adapted for supplying a prescribed voltage, herein a voltage $V_{EE}$ equal to the voltage supplied to the power source terminal 73. The switching circuits 82 and 83 are controlled and switched by a switching pulse $P_{SW}$ supplied to the terminal 85 from the aforementioned OR gate 9. With the switching pulse $P_{SW}$ at the high (H) level, the outputs of the operational amplifiers 79 and 80 are supplied to the bases of the transistors $Q_6$ and $Q_{10}$ and, with the switching pulse $P_{SW}$ at the low (L) level, the voltage $V_{EE}$ at the terminal 84 is supplied to the bases of the transistors $Q_6$ and $Q_{10}$.

Figure 12:
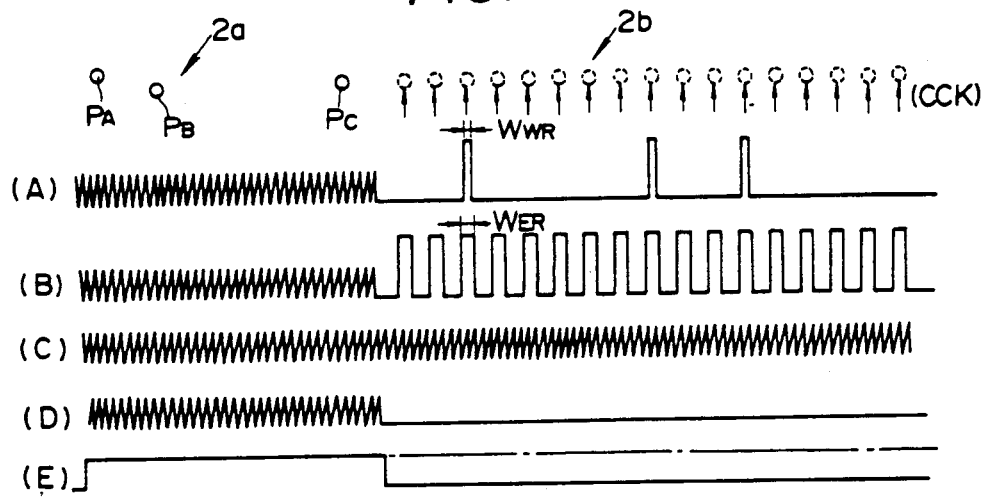
FIG. 12 is a timing chart for understanding the operation of the laser drive circuit shown in FIG. 11.

In the present embodiment, the operation of the modulator 12 and the delay compensation circuit 10 is switched by the erasure mode signals $S_{ER}$ and the write mode signals $S_{WR}$ supplied to the control input terminals 5 and 6, such that, responsive to the data $D_1$ supplied to the signal input terminal 11 during the write operating mode, data pulses timed with the aforementioned channel clocks CCK are supplied from the modulator 12 via delay compensation circuit 10 to the terminal 75 of the laser drive circuit 13, whereby, as hown in FIG. 12A, the laser diode 21 is driven by pulses to write data on the data region 2b of the opto-magnetic disk 1. With the erasure mode operation, erasure pulses timed with the aforementioned channel clocks CCK are supplied from the modulator 12 via delay compensation circuit 10 to the terminal 75 of the laser drive circuit 13, whereby, as shown in FIG. 12B, the laser diode 21 is driven by pulses to effect data erasure. For more reliable erasure, the delay compensation circuit 10 operates to provide the erasure pulse for the erasure mode having a larger pulse width $W_{ER}$ than the pulse width $W_{WR}$ of the write pulse for the write mode.

During the read mode, the terminals 71 and 75 are maintained at the L-level during the period corresponding to the pit region 2a and the data region 2b, that is, the totality of the pulse period, for high frequency driving of the laser diode 21 to read out data, as shown in FIG. 12C.

During the stand-by mode, the terminal 75 is maintained at the L-level during the period corresponding to the data region 2b, as shown in FIG. 12D, to stop the driving of the laser diode 21 to perform only reading of the pit region 2a.

In the present drive control system, the switching pulse $P_{SW}$ shown in FIG. 12E, that is, the pulse going high during the driving period of the laser diode 21 corresponding to the pit region 2a and going low during the non-drive period of the laser diode 21 corresponding to the data region 2b, is supplied from the pulse generator 44 via OR gate 9 to the terminal 85. In this manner, during the drive period of the laser diode 21, the output of the operational amplifier 79 is supplied to the base of the transistor $Q_6$ to effect the automatic power control by the APC circuit including the photodiode 22 to provide the constant output or light intensity of the laser diode 21. During the non-drive period, the voltage $V_{EE}$ at the terminal 84 is supplied to the bases of the transistors $Q_6$ and $Q_{10}$ so that these transistors are turned off to prevent the current from flowing thorugh resistors $R_1$ and $R_3$. When the current is prevented in this manner from flowing through the resistors $R_1$ and $R_3$ during the non-drive period, power consumption can be reduced to about one ninth that when using the drive control system shown in FIG. 6, so that degradation of the circuit elements due to heat generation is also prevented.

Although the foregoing description has been made of the apparatus employing the opto-magnetic disk as the recording medium, the technology disclosed in the present invention is applicable to any erasable recording media other than the opto-magnetic disk.

What is claimed is:

1. An optical disk recording and reproducing apparatus comprising disk drive means for revolving an optical disk at a constant angular velocity, said disk including pit regions having servo pits and data regions on which data can be recorded, said pit and data regions being alternately provided along the circumferential direction of the disk, an optical head including a laser diode emitting laser light irradiating said optical disk, first detection means to detect light reflected from said servo pits in said pit regions and light reflected from said disk in said data regions, reference clock pulse generating means for forming reference clock pulses synchronized with said servo pits on said optical disk, said reference clock pulse generating means being connected to said first detection means and responsive to an output therefrom obtained from detecting said servo pits and for generating said reference clock pulses in response thereto, and a laser drive means connected to receive said reference clock pulses for driving said laser diode with pulses in synchronism with said reference clock pulses while said laser diode is irradiating said data regions, with data in said data regions of said optical disk being erased by driving said laser diode with said pulses.

2. An optical disk recording and reproducing apparatus according to claim 1, including means connected to receive said reference clock pulses for supplying drive pulses for data writing to said laser drive means in synchronism with said reference clock pulses, whereby said laser diode is driven with said drive pulses to write data onto said data regions or to erase data from said data regions by writing predetermined data.

3. An optical disk recording and reproducing apparatus according to claim 2, characterized in that data are recorded on said data region by drive pulses synchronized with said reference clock pulses at the rate of one bit of data per pulse, with data being erased from said data region on a bit-by-bit basis.

4. An optical disk recording and reproducing apparatus according to claim 3, characterized in that said laser drive means causes the driving of said laser diode to be stopped during the interval between said drive pulses for data erasure or data writing which drive said laser diode in synchronism with said reference clock pulses.

5. An optical disk recording and reproducing apparatus according to claim 3, characterized in that said laser drive means includes means causing an extremely small current to flow through said laser diode during the interval between said drive pulses for data erasure or data writing which drive said laser diode in synchronism with said reference clocks.

6. An optical disk recording and reproducing apparatus according to claim 5, characterized in that said extremely small current is supplied to said laser drive means in the form of high frequency current.

7. An optical disk recording and reproducing apparatus according to claim 6, including reading means connected to said head for reading out data from said optical disk, said reading means including for driving said laser diode with said high frequency current during operation of said reading means, whereby data recorded on said optical disk are read-out in response to the laser output of said laser diode.

8. An optical disk recording and reproducing apparatus according to claim 1, including an automatic power control circuit provided in said laser drive means, said automatic power control means including sample and hold means connected to receive said reference clock pulses, and control means connected to said sample and hold means for controlling the output level of said laser diode at a constant power level by power control signals formed by operation of said sample and hold means in response to said reference clock pulses.

9. An optical disk recording and reproducing apparatus according to claim 8, characterized in that said automatic power control circuit includes switching means for interrupting the operating current of said laser drive circuit during periods when the data is not being written to or read or erased from said optical disk.

* * * * *